April 25, 1967 F. H. SCHALLER 3,315,955

COMPUTER DEVICE

Filed May 20, 1965

3 Sheets-Sheet 1

INVENTOR.
FRANK H. SCHALLER

BY John J. McCormack
ATTORNEY.

3,315,955
COMPUTER DEVICE
Frank H. Schaller, Needham Heights, Mass., assignor to Honeywell Inc., a corporation of Delaware
Filed May 20, 1965, Ser. No. 457,330
14 Claims. (Cl. 271—3)

The present invention relates to unit record manipulating means associated with data processing systems and more particularly to transport means adapted to urge computer records along a prescribed path and to selectably redirect the records transverse to this path, on-the-fly, i.e. without arresting their original motion.

The speed and accuracy of electronic data processing is placing increasingly greater demands upon mechanical elements in a computer system. This is especially true of unit record handling sub-systems, such as apparatus for manipulating punched cards for purposes of data processing input or output. Although such unit records comprise a useful medium for storing computer data, it has become problematical to use them for communicating with computers, since electronic data processing speeds are many times faster than the fastest conceivable record-manipulation devices. For instance, the central processing unit of an electronic computer requires only about one to five milliseconds to "read" a standard 80-column punched card, while conventional card handling apparatus requires about 75 milliseconds to transport the card past the read-head.

One factor limiting card transport speeds is the problem of "turning corners" within card handling apparatus, i.e. radically changing the direction of card transport. Prior art apparatus customarily uses stop means to decelerate a card along a first direction and thereafter propels the card transversely around the corner. It will be apparent that it requires precious processing time to perform this deceleration-acceleration function; a sequence which also needlessly dissipates kinetic energy that must be resupplied to the card.

Associated with this problem of providing stop means for card-cornering stations are the requirements for machine reliability and accuracy. It is recognized that a cornering stop, against which cards are customarily slammed at speed of about 160 in./sec., can be expected to fray and distort the card-edges, especially over periods of extended use. Deterioration of card edges, in turn, causes misalignment and erratic feeding of the cards which leads to inaccurate card-processing and, eventually, to serious jam conditions. Computer jams can cost thousands of dollars in "down-time." Thus, the lost time and card damage caused by such stops have become less and less tolerable as electronic data processing increases the speed and accurately of data manipulation and also increases the cost of "computer-time."

Hence, both to improve the speed of unit record "throughput" and to eliminate the card damage induced by cornering stop means, it appears to be very advantageous to make computer records "turn a corner" without impacting them against a stop. The present invention provides a solution to these problems through novel "stopless" card transport means for redirecting cards "on-the-fly," without impacting them against stop means.

Card handling apparatus must often include card-eject means which are capable of stacking cards in plurals modes, that is, so that selected cards may be laterally misaligned, or offset, along an alternative center-line in the output stack. For example, "reject" or marker cards are sometimes "offset" to identify and segregate them. Relatively complex means have been employed to perform the offset function means which also increase the intra-machine transport path and handling time, with a resultant loss in card throughput speed. Prior art card-ejectors have commonly employed relatively complex timing control means which are somewhat problematical to maintain in accurate adjustment. Such controls are frequently difficult to modify so as to include an offset ejection mode. Contributing to the complexity of prior art ejectors is the fact that they must commonly be provided with synchronization controls to synchronize the ejection actuators with reference operations, such as the operations of transport means, clocking means, or the like.

The present invention provides an asynchronously actuated ejector means which is being energized simply by the approach of a document and independent of other machine operations. The invention is adapted to thrust a document transversely of its approach-path "on-the-fly." The novel ejection technique lends itself to simple adaptation for an offset mode; for example, simply by inhibiting one of two presence-detectors. It will be evident to those skilled in the art that a system with this capability dispenses with an abundance of control parts and associated maintenance problems, as well as allowing faster eject-actuation.

Solenoid-actuated drive means have been employed in prior art record transport systems, for instance, because they are readily operated by an electrical control pulse. However, solenoid-actuators are "short-stroke" devices in that they characteristically suffer a marked loss in output power beyond a relatively short excursion distance (of the armature) and are best adapted for thrusting low-mass loads over a short distance. Solenoid actuators can, of course, provide very quick responses; for instance, to activate a card-pusher under high acceleration. However, punched card acceleration is, preferably, not only high, but repetitive at relatively high frequencies and thus will quickly wear out conventional pusher elements due to extreme vibrational fatigue and frictional forces.

Such high-frequency, high-acceleration actuation also makes it difficult to quickly bring ejector elements to quiescence soon enough to resume a succeeding ejection-cycle. The present invention teaches a solenoid-actuated record ejector arrangement which meets the above problems by employing a pusher blade whose configuration and inherent properties produce a mechanical amplification of a short solenoid stroke. While this novel blade can impart a high ejecting torque, it also presents a relatively low mass solenoid load despite its extended length.

The novel pusher blade according to the invention is also resilient and self-centering, being flexible both in itself and in its suspension. This eliminates frictional wear-points and fatigue stresses, as well as extending blade-life. The inventive solenoid ejector arrangement also provides an arrangement whereby the flexible pusher blade may be rendered self-damping after actuation, according to a simple backing-plate arrangement. Prior art actuators used in connection with document manipulation systems fall short in various ways of attaining the above-described operating characteristics.

It is accordingly an object of the present invention to provide a record diverting arrangement associated with record manipulating apparatus which is not subject to the above, and related, disadvantages and which resolves the above-mentioned difficulties in the prior art.

It is a further object of the invention to provide such an arrangement for thrusting unit records transversely, "on-the-fly," with no need for record-stop means.

It is another object of the invention to provide a record ejector system which is controlled for both normal and "offset" ejection modes by means simply of signals from presence detector means.

Yet another object of the invention is to provide such a solenoid-actuated ejector which is long, light and resilient to amplify solenoid thrust while presenting a low mass solenoid-load.

Another object is to provide such an ejector which can inherently amplify the short stroke of a solenoid and maintain record contact over longer excursions.

Yet another object is to provide such an ejector device which is free from frictional wear-points, being suspended on flexure means.

Yet another object is to provide such a device having a pusher blade which is self-damping.

The foregoing objects of the invention are achieved by the provision of a record diversion station adjacent a corner in a transport path, the station including solenoid-actuated, resilient record-thrust means and presence detector means for controlling actuation according to the presence of unit records as they pass along a prescribed path to be thrust transverse thereto "on-the-fly." Electronic controls are also provided to combine the output from the detectors so as to allow selection of ejection time, or times.

The various features of novelty which characterize the invention are pointed out with particularity in the claims annexed to and forming a part of the present specification. For a better understanding of the invention, its advantages and specific objects obtained with its use, reference should be had to the accompanying drawings and descriptive matter in which there are illustrated and described preferred embodiments of the invention. In the drawings, wherein like reference numerals denote like parts:

Figures 1, 2:
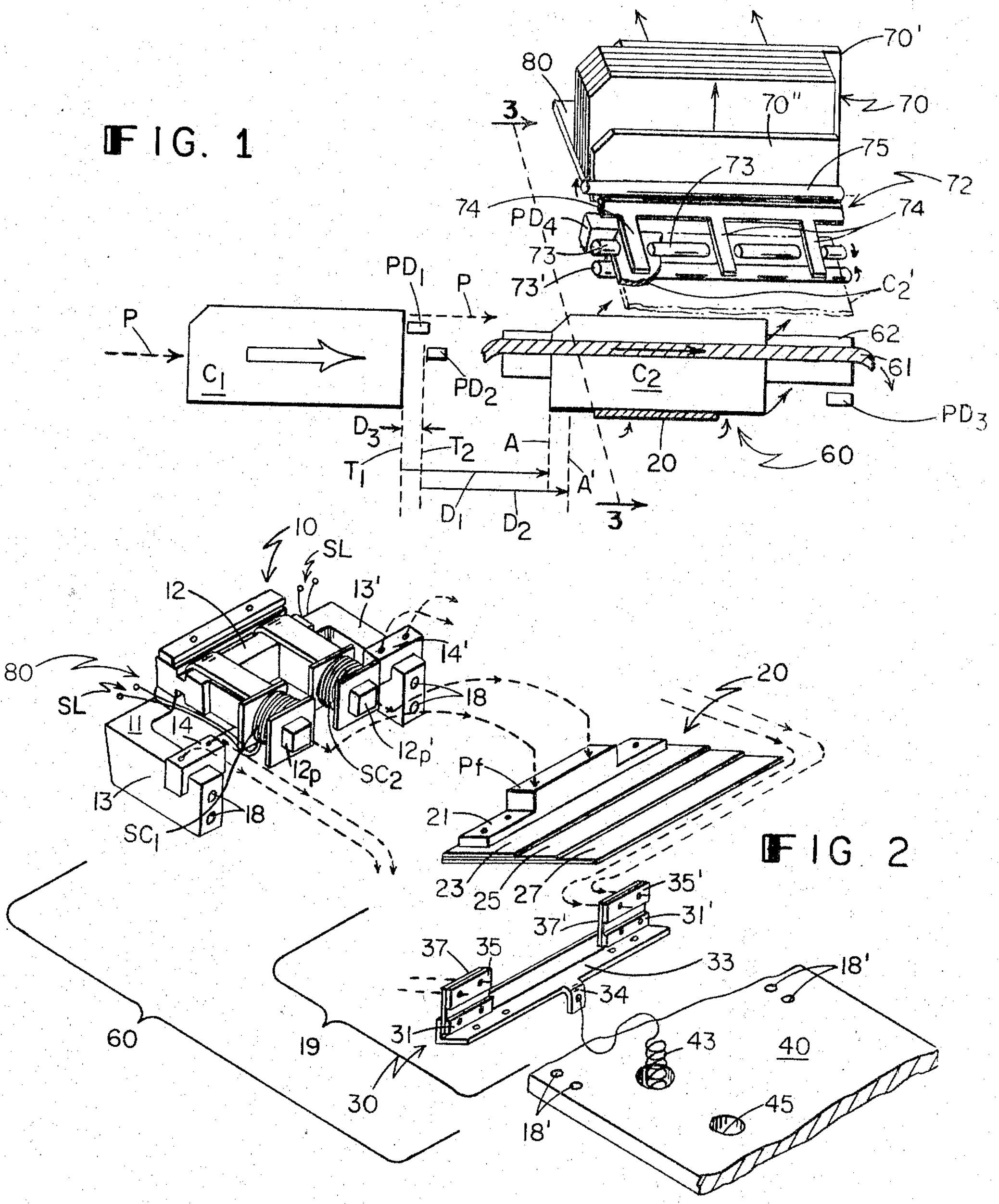
FIGURE 1 is a schematic perspective top view of a punched card ejection system according to a preferred embodiment of the present invention.
FIGURE 2 is an arcuately-exploded, perspective view of a solenoid-actuated card-thrust means adapted for employment in the system of FIGURE 1 according to the invention.

Referring first to FIGURE 1, there is here illustrated a preferred embodiment of a record transport apparatus which is adapted to act upon punched-card type unit records as they approach a solenoid actuated ejector 60 along a prescribed path P. That is, means are provided to thrust the cards transversely of path P into a stacking arrangement 72 for prescribed alignment in an output stack 70. The operative environment of the invention will first be described, with reference to FIGURES 1 and 3, both to inter-relate elements and to indicate their function, structural details being explained thereafter. It will become apparent that unit records, or documents, such as punched card C1, may be advanced along path P by means (not shown) which introduce them between a moving drive belt 61 and a smooth, stationary eject platform 62 in prescribed alignment. Resilient drive belt 61 is adapted, both to press the cards lightly against platform 62 and to advance them along path P in prescribed alignment, whence they may be thrust transversely to a stacking means 72 by a driven blade portion or kick-blade 20 of solenoid ejector 60. It may be assumed that drive belt 61 (shown only in part) is a conventional endless web, of rubber or the like. Belt 61 is somewhat narrower than the cards and arranged to be continuously driven at a prescribed speed, by pulleys (not shown) which are disposed to urge it downwardly against platform 61. Thus, belt 61 holds the cards against platform 62, while sliding them smoothly thereacross. Once a card has been engaged between belt 61 and plate 62, it is in a "ready-to-be-ejected" condition, as is exemplified by card C2. As explained below, the kick-blade 20 may then be energized at selected times to thrust the card, "on-the-fly," toward stacking means 72, i.e. while belt 61 is advancing it along the ejection platform 62.

Figures 3, 7:
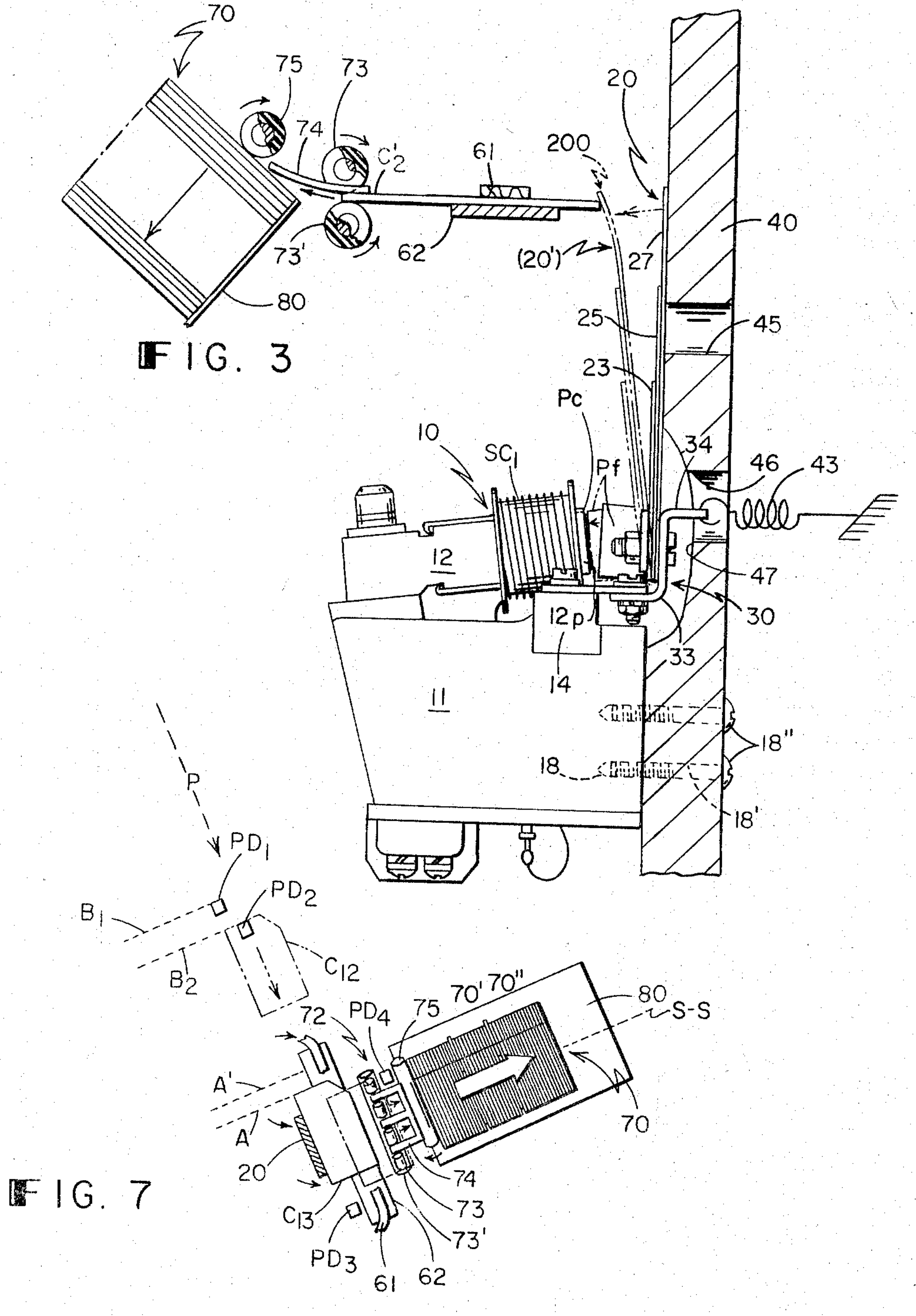
FIGURE 3 is a side elevation of the thrust means of FIGURES 1 and 2 in partial section along lines 3—3, as assembled and positioned relative to a backing plate and to stacking elements.
FIGURE 7 is a top view of an arrangement similar to that of FIGURE 1, but modified slightly.

Stacking means 72 comprises guide fingers 74, a pair of cooperating, constantly-rotating rollers 73, 73' and a keeper roller 75, as best seen in FIGURE 3, all arranged to advance cards into a stack, or magazine, 70 of similar cards disposed upon a stacking platform 80. The thrust of rollers 73, 73' drives the cards against the stack 70 and thereafter into alignment therewith, being guided by fingers 74 and advanced into the stack by constantly-rotating keeper roller 75.

The approach of a card (e.g. C1) along path P may be detected by a pair of presence detector means PD1, PD2, which are adapted to detect the passage of cards at different prescribed locations fixed at prescribed distances (D1, D2) from the ejector 60. As seen below, detectors PD1, PD2 may provide a timed control for both the "Normal" and "Offset" ejection of cards toward stacking means 72. Jam detection is provided by a pair of presence detectors PD3 and PD4. Detector PD3 is so located, relative to ejector 60, that by detecting the presence of a card, it indicates "card override" and thereby "Late," or defective, operation of ejector 60. Jam detector PD4 is adapted to indicate a "stacking jam" by detecting card-presence in stacker 72 at particular times during the ejection cycle. Thus, detector PD4 indicates whether a card, which has been thrust by kick-blade 20 to be advanced by continually rotating rollers 73, 73' has been properly (i.e. timely) advanced to be stacked. Detector PD4 is, therefore, interrogated as to: "whether a card is present after the time during which stacking should normally have occurred." Thus, when the presence of a card is detected by override detector PD3 or by stacking jam detector PD4 (at the proper interrogation time), suitable controls and indicators may be energized to indicate malfunction to the machine attendant and to automatically stop the transport system so as not to aggravate a jam condition by continuing to advance cards into the jam.

Card ejection may be very simply controlled by detecting the passage thereof adjacent presence detectors PD1, PD2, the output of which is employed, after the card has been advanced to ejection means 60, to initiate the ejecting thrust of kick-blade 20. In this way, a card (C2), being transported along eject platform 62, may be directed, "on-the-fly," by kicker plate 20 to stacker 72. For example, platform 62 is so disposed that such a transverse thrust on a card (C2) will drive it between stack rollers 73, 73' and finger guides 74, as FIGURE 3 shows. Preferably, the pressure of drive belt 61 against the card (C2) and underlying platform 62 will be kept uniform and yielding enough so that the card is diverted "cleanly" and enters stacker 72 evenly (as at C2'), without being skewed. Cards are transported along injection path P; and belt 61 and kick-blade 20 are disposed, so that cards (C2) project sufficiently beyond platform 62 to accommodate the diverting thrust of blade 20, this thrust being sufficient to engage the card with stacker 72. This arrangement should be such as to bring card-edges closely adjacent blade 20 so that very little solenoid-thrust is wasted when solenoid 10 starts to move plate 20. This propinquity (card-edge to blade 20) will also assure parallelism therebetween, thus assuring card-alignment during diversion and engagement with stacker 72.

Actuation of kicker or ejector 60 will be seen to be asynchronous, i.e. time-independent with respect to the other card-manipulating means, such as belt drive 61 and stacker 72. The compound ("on-the-fly") motion imparted to cards as they are diverted by kicker 60 is indicated by arrows in FIGURE 1 (and, for a modified embodiment in FIGURE 7). That is, the arrows from card C2 indicate that, when diverted by kicker blade 20, the diversion path of the card (C2) will resolve two components of motion, i.e. the motion along its original path P provided by belt 61 and the transverse motion towards stack 70 provided by blade 20.

*Ejector control, in general*

As discussed below, ejector 60 is of the solenoid-actuated type, the initiation of which is especially adapted to be controlled, asynchronously by electrical signals provided by presence detectors PD1, PD2. Detectors PD1, PD2 may comprise conventional photo-transducer units energized by suitable illumination means (not shown). This eject-control will become more apparent upon consideration of the circuit indicated in FIGURE 4, but in general, will be understood to govern the initiation time of kick-blade 20 so that it thrusts cards (e.g. C2) from platform 62 at prescribed times, corresponding to prescribed intended positions in stack 70. For example, the output of Normal detector PD1 may be used to provide a "Normal" stacking position, while the output of Offset detector PD2 may alternatively initiate Offset stacking alignment (e.g. at 70′), according to certain control logic. This logic may cause the output of PD2 to initiate blade 20 at a different (e.g. later) time than for Normal stacking. Normal ejector control PD1 may be located a suitable distance D1 from its associated eject position, i.e. from axis A. Axis A thus locates the prescribed position of a trailing card-edge when "Normal-eject" is to be effected; from which position cards will be normally "kicked" into stacker 72. Thus, suitable electrical controls (indicated below) may be provided so that when Normal photo-detector PD1 indicates (i.e. is uncovered by) passage of a trailing card-edge, a signal will be generated by for initiating blade 20 at the time when the trailing card-edge falls along axis A, given prescribed transport speeds between PD1 and axis A. In a similar manner Offset detector PD2 is located in prescribed distance D2 from "Offset axis" A′, the proper trailing card-edge position for Offset eject mode. This asynchronous ejection control is a feature of the invention; one which both makes "on-the-fly" ejection practical and is especially adapted for use with solenoid-ejector means of the type shown. Thus, according to the invention, an Offset control (e.g. presence detector PD2) may be spaced a prescribed distance D3 along card path P from Normal ejector control PD1 corresponding to the desired Offset spacing. Of course, PD2 may be located either upstream or downstream of PD1, depending upon which type of Offset is desired, leading or lagging. Suitable control logic arrangements, for instance, as shown in FIGURE 3, will allow the output signal from Offset detector PD2 (indicating passage of card C1) to differently control the actuation of kick-blade 20, thus causing the ejection of a card from stacking platform 62 at a time somewhat later than that indicated by Normal ejection control PD1. Thus, when the "Offset control" is invoked, detector PD2 may in the manner of normal detector PD1, generate a signal which commands ejector 60 to kick the card from the "Offset" position along plate 62, indicated by trailing-edge axis A′ (illustrated card C2 being shown in the "eject-for-no-offset" position, however).

*Ejector device*

The structure and operation of ejector 60 is best shown by FIGURES 2 and 3. Functionally, ejector 60 constitutes an electrically-energized, solenoid-actuated document translation means. Ejector 60 may preferably comprise a solenoid, or electromagnet, portion 10 and an armature portion 19, which is flexibly mounted on the housing of solenoid 10 so as to present an armature pole P*f* in spaced, driven relation to a pair of solenoid pole pieces 12P, 12′P. Armature 19 includes a multipart kick-blade 20 carried by armature pole portion P*f*. Blade 20 is disposed to be held in abutting coplanar relation with a fixed backing plate, or wall, 40 (not shown in FIGURE 1) in its unactivated, "rest" state. Solenoid 10 comprises a bifurcated, U-shaped field piece 12 of readily magnetizable (preferably ferro-magnetic) material fixedly mounted on a stationary block 11 of non-magnetizable material. Field piece 12 includes a pair of legs terminating in a pair of relatively identical flat-faced pole pieces 12P, 12′P, the legs being wrapped with a pair of oppositely-wound field coils SC1, SC2, respectively. Thus, pole pieces 12P, 12′P are oppositely magnetized in a conventional manner. A pair of lead terminals SL, supply current to coils SC1, SC2. A pair of mounting plates 14, 14′ are provided on block legs 13, 13′, respectively, being disposed "outboardly" about pole pieces 12P, 12′P. As described below, mounting plates 14, 14′ may be somewhat oblique with respect to the normal to the flat, parallel engaging faces of pole pieces 12P, 12′P for purposes of mounting the armature P*f* to pivot into proper "mating" relation to the pole pieces 12P, 12′P. Thus, as seen in FIGURE 3, poles 12P, 12′P are mounted relative to plates 14, 14′ and pole P*f* is so coupled thereby, that the flat faces of solenoid poles 12′P, 12P are disposed to be so oblique relative to the face of armature pole P*f*, allowing these faces to mate, and be relatively coplanar, when pivoted into engagement. Solenoid poles 12P, 12′P are preferably each provided with outer pole covers PC to engage armature pole P*f*.

Pole covers PC provide a minute high-reluctance gap between poles 12P, 12′P and pole P*f*, to overcome any residual magnetism therein and facilitate the quick, easy disengagement thereof. Thus, covers PC should comprise a non-ferromagnetic (preferably dia-magnetic) high-reluctance material, beryllium copper having been found very suitable for this purpose. It is preferred that poles 12P, 12′P be made relatively large in cross-sectional area, both to reduce wear (by reducing impact pressures thereon) and to provide a large cross-sectional area for the low-reluctance transfer of magnetic flux to armature pole P*f*.

A magnetizable armature portion 21 of blade 20 is suspended through a flexible coupling means 30 from solenoid block 11 so as to present armature pole P*f* in prescribed spaced relation to solenoid poles 12P, 12′P. Armature 21 is comprised of readily magnetizable, preferably ferro-magnetic, material. Pole piece P*f*, protruding from armature 21, is formed to continuously engage the entire facing surfaces of solenoid poles 12P, 12′P when attracted thereto by the magnetic field thereof, resulting from the passage of current through coils SC1, SC2. FIGURE 3 shows this "actuated" mating engagement, in phantom. The cross-sectional area of armature pole P*f* is arranged to be somewhat larger than that of solenoid poles 12P, 12′P together and also to bridge the inter-pole space therebetween. Thus, any loss of fringing magnetic flux emanating from the solenoid poles will be minimized, since wider pole P*f* provides a low-reluctance return-path therefor. Armature pole P*f* thus efficiently completes the magnetic flux circuit between solenoid poles 12P, 12′P as a minimum-reluctance magnetic shunt.

It will be seen that armature 21 is suspended by coupling 30 to pivot pole P*f* in a somewhat compound motion against the faces of solenoid poles 12P, 12′P. That is, when pole P*f* is attracting from its rest position (full line in FIGURE 3), it will be pivoted on resilient coupling 30 to move slightly downward and toward poles 12P, 12′P. The relative disposition of poles 12P, 12′P and pole P*f* and the angular relation of the mating faces thereof will be seen to assure continuous pole-engagement when blade 20 pivots toward solenoid 10 on flexure coupling 30. The inter-pole gap, i.e. between armature pole P*f* and poles 12P, 12′P (with covers PC thereon), determines the attractive force therebetween according to a well-known inverse-square relation and is thus a critical factor in the speed and force of blade actuation. Thus, an adjustable clamp means (not shown) may be provided to make this gap adjustable by moving pole piece 12 relative to solenoid block 11. The air gap thus introduced can be used to control the operational speed and thrusting force of the blade 20.

As FIGURE 2 shows, armature 21 constitutes a base portion on which is fixedly mounted a multi-part pusher blade asembly 20. Blade 20 comprises a plurality of overlying flexible, blade segments, or leaves 23, 25 and 27. The assembly comprising blade 20 is, in turn, fixedly mounted along one side of "right-angle" header portion 33 of coupling 30. Header 33 is, in turn, adapted to be resiliently coupled to solenoid block 11 through a pair of flexure leaves 37, 37′. Flexure leaves 37, 37′ are fixedly clamped, at one end, to one side of angular header 33 by plates 31, 31′ so as to project transverse to the plane of blade 20. The other ends of flexure leaves 37, 37′ are similarly clamped, with plates 35, 35′ and suitable bolts (not shown) upon plates 14, 14′ of solenoid block 11. Flexure leaves 37, 37′ preferably comprise thin, flat spring-steel plates which are relatively rigid along their planes, but are relatively resilient along the normal thereto. Plates 35, 35′, plates 31, 31′ and coupling base 33 may comprise rigid metal stock, suitably formed.

The lateral rigidity provided in the flexible coupling leaves 37, 37′ is also advantageous, in that, unlike articulated internally-movable pivots, it resists lateral displacement or twisting which could misalign the ejector blade 20 and cause improper record diversion.

While header 33 is shown as "right-angular" and surfaces 14, 14′ are shown slightly "out-of-normal" with respect to the faces of poles 12P, 12′P, it will be apparent that either, or both, of these angular dispositions may be changed so long as, together, they arrange the faces of the armature pole P*f* and solenoid poles 12P, 12′P to be confronting in coplanar, contiguous engagement. Similarly, the attitude of the mating face of armature pole P*f* may be modified to accommodate such changes.

Thus, with kick-blade 20 and flexure leaves 37, 37′ affixed to coupling 30 in orthogonal relation, it will be seen that blade 20 may be pivotably driven and armature pole P*f* thrown into, and out of, engagement with pole faces 12P, 12′P without the use of abrading pivot means. This eliminates wear points and other frictional components subject to wear. The flexible coupling 30 provided by resilient leaves 37, 37′ is virtually wear-free, being kept within its stress limits by stopping engagement against poles 12P, 12′P, on the one hand, and against backing plate 40, on the other. Since FIGURE 2 shows parts exploded arcuately (over about 90°), it will be apparent that, with the armature-containing blade 20 affixed to coupling 30 (which, in turn, is affixed on solenoid block 11), block 11 is intended to be affixed, at points 18, 18″, to plate 40, such as by bolt means 18′ and registering holes (see also FIGURE 3).

*Blade*

The multi-part blade comprised of blade segments 23, 25 and 27 is adapted to be flexible and resiliently actuable, as indicated at 20′ in FIGURE 3, for instance. The overall blade 20 is thus adapted to mechanically amplify the short thrust imparted by the magnetic attraction of armature pole P*f* against solenoid poles 12P, 12′P so as to elongate actuation-excursions by virtue of its inherent resilience. This mechanical amplification is effected, according to the invention, by forming blade segments or resilient foils 23, 25 and 27 of thin, normally-resilient plate stock, preferably spring steel or the like. Such a leaf spring structure has great lateral rigidity (i.e. rigid in its own plane).

It will be apparent to those skilled in the art that many advantages accrue from the employment of such a resilient blade. For instance, while it is efficient and convenient to employ short-stroke solenoid actuators for card-thrust purposes, these actuators operate inefficiently over long distances, and are not, of themselves, adapted to provide a guiding thrust which "follows" a card any appreciable distance. This can be important, for instance, to assure that an ejected card (e.g. C2 in FIGURE 1 and C′2 in FIGURE 3) is kept aligned properly, and not skewed, en route to the stacker. For example, such a skew might otherwise result due to unequal gripping pressures from belt 61. Thus, the use of a flexible blade 20 allows efficient employment of solenoid actuator mechanisms which are enabled to extend actuator thrust over longer distances and maintain contact with the impelled document to assure that it reaches its destination in prescribed alignment. While such a result might be achieved with a pivotable blade, it will be recognized that the resilient flexible blade according to the invention is not subject to the frictional wear endemic to prior art pivot structures which have metal-to-metal wear points and thus the invention also eliminates lubrication and other maintenance.

In certain alternative arrangements, it may be preferred not to continuously guide documents en route to the stacker, but instead remove contact to allow the card to "fly" freely. Such a "free-travel zone" might be provided, for instance, to allow card-deceleration prior to engagement with the whirling rollers 73, 73′ of stacker 72. This would allow greatly increased card-acceleration by kicker 60 according to the invention, without requiring a corresponding increase in stacker roller speeds. Another feature of resilient blade 20 is that its resilient leaves are stacked in overlying, cantilevered fashion. Thus, leaves 23, 25, 27 are fixed upon a common armature-base 21 to project different, prescribed progressively increasing effective lengths from this common pivot base. Thus, is provided an outwardly tapered, i.e. progressively-elongated, blade 20. This cantilevered construction is one which derives several advantages especially useful in the manipulation of computer documents. Such as construction provides strength over an extended overall blade-length and distributes the flexure stresses of the overall blade over a broader area, thus reducing the stress concentration, and resultant likelihood of blade fatique, at any one blade-sector. Thus, the invention avoids stress concentration leading to breakage, deformation and loss of elasticity of blade members. The wear resistance thus provided is critically important at the unusualy high acceleration rate attainable with this solenoid structure and can means the difference in blade "life" between millions of cycles and a few hundred thousand (for a conventional single-leaf blade).

Since the blade leaves may be interconnected at only one end (e.g. adjacent armature piece 21) it will be apparent that, under high acceleration, the blades (23, 25, 27) may separate adjacent their outer tips, thereby allowing a quick "segmented" or incremental acceleration of blade leaves individually. Such has been observed, it appearing that armature 21 at first pulls blade 23 away from blade 25, and then pulls blade 25 away from blade 27, thereafter letting the blades close in a "slapping" action. This slapping action, or "stepped-acceleration," releases a major portion of stored energy at the end of the thrust to accentuate the "whiplash" effect whereby blade tip 200 "follows" a card (of FIGURE 3). Additionally, this strengthened construction provides a lighter blade which, though strong, has a low-torque mass-distribution which places most of the blade-mass close to the pivot point. Thus it is a feature of the invention that it provides a tapered record-diverting blade, which, whether multi-part or solid, acts to reduce the load presented by the blade, to better distribute stresses therein, to amplify the resiliency thereof at the working tip thereof and provide a whiplash action and the like. Thus, such a blade is especially adapted for actuation by solenoid devices which are most efficient at light, low-torque loads. Therefore, the multi-blade, segmented construction of the invention provides maximum blade flexibility and blade-excursion where it is most needed, at the extremity of the blade 20 and adjacent the impelled card (e.g. C2).

It will be apparent from FIGURE 2, and especially from FIGURE 3, that kick-blade 20 is arranged to be positioned closely adjacent a backing plate 40 in its rest (i.e. quiescent, or unactivated) state; the activated state being shown at 20′ (along the dotted line) in FIGURE 3. More particularly, the rear surface of rear blade leaf 27 continuously contacts wall 40, in coplanar, conforming relation. Besides advantageously providing a stop limit for the actuator assembly, this disposition of backing wall 40 can more quickly bring blade 20 to quiescence after actuation by damping out any sympathetic vibrations thereof. Thus, it is a feature of the invention that a backing wall 40 is disposed in continuous, coplanar contiguity with the ejector blade. It has been found that this coplanar abutment of blade 20 against a portion of backing plate 40, with little or no perceptible gap therebetween, provides an extremely efficient damping action. Thus, after blade 20 has been actuated and flexed thrustingly (into position 20′), it co-acts in its "return" mode with abutting plate 40 to produce a "quasi-dash pot" effect, creating a pneumatic drag resisting any following, reactive thrusts of blade 20 and helping to quickly return it to "rest."

Such a damping will be recognized as important in the art of record actuation since the frequency of "card-thrust" is limited by the "relaxation-time" required to restore the actuator (e.g. blade 20) between thrusts. By reducing this relaxation time, the arrangement of blade 20 against plate 40 increases the capability of actuator 60 for high frequency operation. To allow this close engagement of blade 20 with backing plate 40, plate 40 is relieved at a recess 47 to receive a protruding tab portion 34 of coupling 33. Recess 47, in turn, is provided with a bore 46 through plate 40 to accommodate tab 34 and a return spring 43 connected thereto. Tab 34 may comprise an extension of coupling base 34 adapted to engage the return spring 43. Spring 43 may comprise a conventional helical extensible tension spring, and is anchored to a stationary structure (not shown).

It has been found, moreover, that the above-described damping co-action of blade 20 with backing plate 40 can be accelerated and optimized by addition of bleed-aperture means, such as a bleed hole or vent 45 in FIGURES 2 and 3. In cases where the above arrangement of blade 20 and wall 40 "overdamps" blade 40, temporarily creating an unwanted pneumatic pressure therebetween, the damping process can be accelerated and higher cycle rates accommodated by controllably exhausting air through vent 45.

Vent 45 may serve another purpose, that of reducing starting drag on blade 20. When solenoid 10 starts to drive blade 20 against card C2, a pneumatic pressure-differential can develop between the two extended surfaces until an appreciable gap is introduced between blade 20 and plate 40. Such a resistance may be characterized as a "static" air-drag upon blade 20 in that it arises somewhat after blade 20 has come to rest against backing plate 40. This is in contradistinction to the above "dynamic "air-drag, or damping, provided by the returning engagement of blade 20 with backing plate 40. It has been found, therefore, that this undesirable static (or starting) drag as well as the dynamic (stopping) drag, can be virtually eliminated by the provision of the relatively small vent 45 through backing plate 40. Thus, for instance, for an overall blade configuration of about seven inches by five inches, a vent 45 of about one-half inch diameter and located relatively central of blade 20 has been found satisfactory.

*Operation*

Although the above description is indicative thereof, the operation of the described embodiment, will be recapitulated for purposes of greater clarity. Thus, referring especially to FIGURE 1, the advance of a card (C1) along path P towards the ejection platform 62 will cause the trailing-edge thereof to cover and uncover presence detector means, namely "Normal" ejector control PD1 and "Offset" control PD2, sequentially. For "Normal eject" the output of PD1 is applied to the solenoid of ejector 60 so that blade 20 strikes the card when it has been advanced by belt 61 to "Normal-eject position" on platform 62, i.e. with its trailing-edge aligned with the Normal ejection axis A (as with card C2 in FIGURE 1). Thus, ejector 60 will be energized to thrust the card transversely of its path along plate 62 and into engagement with stacking means 72 (as depicted for card C′2 in FIGURE 3). To effect this, the output from detector PD1 will, at this "eject-time," cause the energization of solenoid coils SC1, SC2, thus magnetizing poles 12P, 12′P to attract armature pole P*f* into engagement therewith. This movement of pole P*f* carries blade 20, pivotingly on flexure coupling 30 to drive the card towards stacker 72, "on-the-fly" in an oblique, compound motion. The flexing sweep of the blade tip 200 (at 20′) will maintain positive engagement thereof with the card until it is engaged by continuously-rotating stacking rollers 73, 73′. Rollers 73, 73′ advance the cards against the stacked card-array 70 or a card weight (not shown) while continuously rotating retaining roller 75 urges the cards into stacked alignment and maintains them there. The inherent resilience of blade 20, together with the tensional urging of return spring 43, act to return blade 20 quickly into abutment with backing plate 40. At plate 40 a pneumatic damping effect will prevent secondary vibrations and quickly bring blade 20 to "rest," bleed hole or vent 45 accelerating this damping.

If Offset ejection is desired, rather than the foregoing Normal ejection mode, an Offset command will enable Offset detector PD2 to control the activation of blade 20 in the same manner as indicated for Normal ejection above, though at a different time, namely, when the trailing card-edge reaches Offset axis A′. This ejection offsets cards as indicated at 70′. As indicated the separation distance D3 between presence detectors PD1, PD2 is a factor in controlling the degree of Offset (e.g. of card 70′ from stack 70); another factor being the circuit logic controlling ejector activation, as explained below. Ejection time, of course, may be changed by changing any of: the position of detectors PD1, PD2; the solenoid attracting force (e.g. pulse gap length); belt speed; kicker blade position—or by introducing variable delay means in the control circuit.

*Control circuit*

Figure 4:
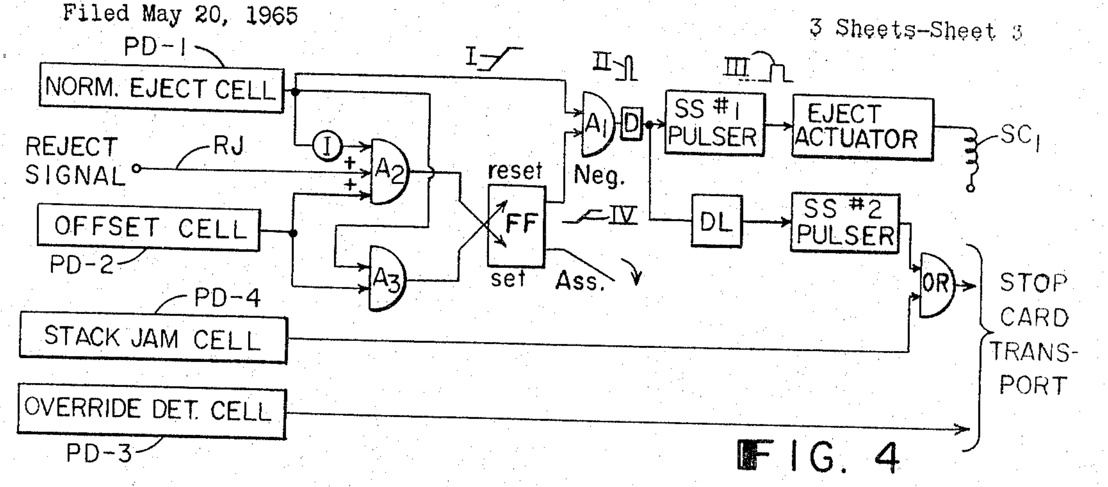
FIGURE 4 is a schematic block diagram showing an arrangement of electronic control means associated with the system of FIGURE 1.
Figure 5:
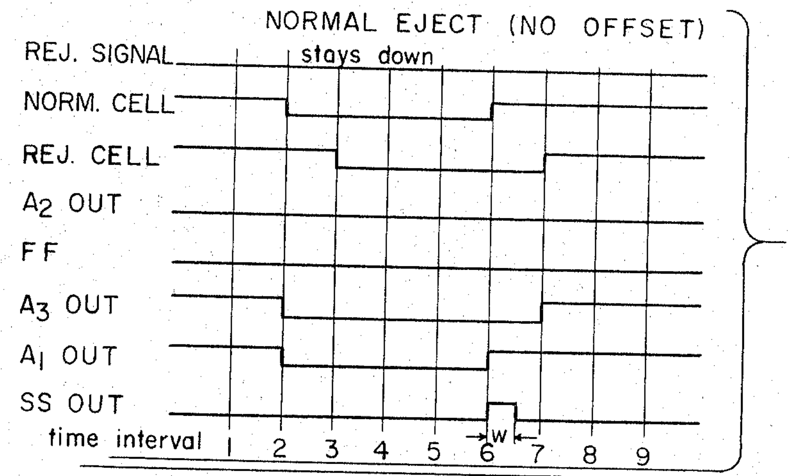
FIGURES 5 and 6 are timing charts indicating the operation of the arrangement in FIGURE 4, FIGURES 5 and 6 relating to Normal and the Offset stacking modes respectively.

FIGURE 4 shows a schematic block diagram form of an electrical control circuit illustrating the controlled activation of ejector 60 by signals from eject control detectors PD1, PD2 and the interrelated outputs from a pair of jam detector means PD3 and PD4. The structure indicated by this logical design will become apparent upon the following description of its operation, especially as related to the output waveforms indicated in FIGURES 5 and 6. In the absence of a passing card, the "normally-active" photo-transducer of detector PD1 will normally impress signals upon a plurality of AND gates A2, A3 and A1. This signal is inverted, as indicated, before application to gate A2 to "enable" gate A2 only when detector PD1 is covered. Gate A2 will normally remain closed, or "down," in the absence of both a reject signal along an input line RJ and an "uncovered" output from detector PD2. A bistable flip-flop FF is normally "on" (Negate) such as to enable gate A1. Gate A1 will be normally "closed" effectively, however, until it is presented with a rising input pulse, which will cause a positive pulse to be emitted by a differentiator D, which may comprise a suitable R-C (or R-L) differentiator. The passage of the leading edge of a card (C1) over detector PD1 ("Normal-eject" cell) will remove the signal applied to gate A1. Gate A1 will be kept "closed" thereafter until the trailing card-edge again uncovers PD1 for re-application of an "uncover" pulse to A1. This "uncover-pulse" will comprise a rising signal so as to provide an A.C. output which can fire differentiator D to, in turn, trigger a pulsing means SS1. Pulser SS1 may comprise a single shot multivibrator which, in turn, can generate an activation current pulse of prescribed duration to be applied to solenoid coils SC1, SC2 of ejector 60. It will be evident that the system must accommodate a "card-transit" time, wherein the trailing edge of a card (C1) travels from detector PD1 to "Normal eject" axis A, i.e. across distance D1 in FIGURE 1. The energization time required to impel kick-blade 20 against a card (C2) and other delay periods inherent in the control circuit may absorb this "card-transit delay," which may be made variable, of course. Where desired, a variable delay means may be provided at the input of SS1. Thus, eject time will be a function of these delays and may be modified by changing the card transit time (i.e. transport speeds or location of PD1) or adjusting suitable electrical delay means as noted above. The above operation is indicated diagrammatically by the waveforms of associated members as indicated in FIGURE 5.

Figure 6:
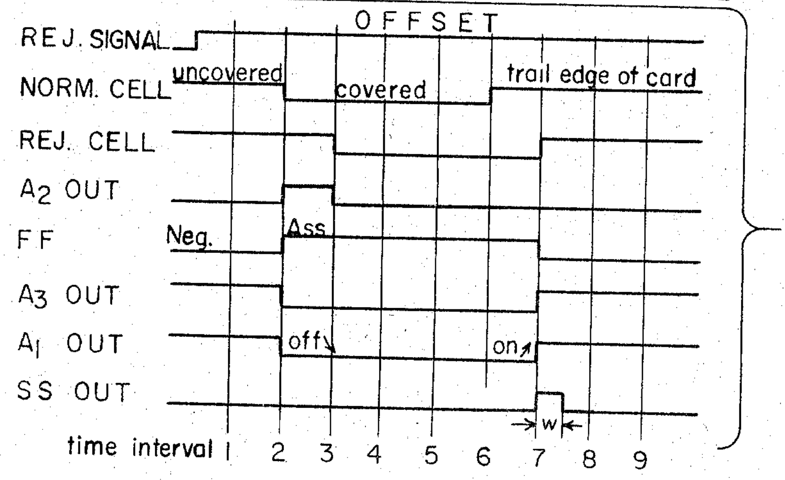

The "Offset mode" is provided as follows, with reference both to FIGURE 4 and to the relevant waveforms in FIGURE 6. It will be assumed that the card handling control means has, at this time, decided that a designated card (C1) is to be "Offset," e.g. because it is a reject card, a marker card, etc. Thus, when card C1 approaches the first ("Normal-eject") presence detector PD1, the "reject signal" will have been applied along line RJ and an "uncovered" output will emanate from detector PD2, both enabling gate A2. Hence, when the leading edge of card C1 covers normal cell (PD1), gate A1 will again be closed and the disabling signal from PD1 will be removed from gate A2 which may then "set" flip-flop FF (to "assert" state), thus, disabling gate A1. The passage of the trailing card-edge over both Normal detector PD1 and Offset detector PD2 (Rej. cell) enables AND gate A3 which may then "reset" flip-flop FF, switching it to its "gating" (or "Negate") state, which presents a rising output on gate A1 (already enabled by uncovered cell PD1), to trigger an output from differentiator D.

Note that unlike "Normal mode," when the trailing card-edge uncovers the Normal-eject cell PD1, gate A1 is still "disabled," flip-flop FF having been switched to non-gating state by the output from gate A2. Therefore, gate A1 cannot "open" until flip-flop FF is "reset" into its gating state by the output from AND gate A3. Gate A3 will thus "reset" FF to initiate an eject-pulse from SS1 when both detector cells are uncovered, i.e. when "downstream" detector PD2 becomes uncovered (cf. time interval #7 FIGURE 6).

Thus, in summary, the logical arrangement shown in FIGURE 4 provides that, for "Normal eject" the ejector 60 will be energized when a trailing card-edge uncovers normal cell PD1; whereas, when a "reject signal" is applied, ejector 60 will, instead, be energized (slightly later) when Offset cell PD2 is uncovered. It will be recognized that this arrangement provides a very simple eject control means. For instance, the amount and type of Offset may be controlled by simple means, such as adjusting delay means in the circuit, interchanging detector outputs, repositioning the detectors PD1, PD2 or the kick-blade 20, changing transport speeds, or the like. For instance, by merely moving blade 20 slightly farther away from platform 62, a constant "kick-delay" will be introduced which by ejecting cards later, will reposition the output stack 70 and the associated offset cards (70') to the right (FIGURE 1) a prescribed uniform amount. An electronic delay could also effect this very convenient coordinated repositioning of stacked cards with the invention.

The ejection pulses to SS1 are also applied along a "jam-detect" line, being delayed at a delay means (DL), applied to a pulse-generating pulser SS2 and then ANDed at a gate OR with the output from stack-jam detector PD4. Delay DL assures that stack-jam condition will be monitored at a predetermined, (delay) time after a document has been ejected, this time being sufficient to assure that proper ejection operation will have thrust the card beyond detector PD4. Thus, the output from gate OR indicates an "error condition" at stacker 72, and may be used to stop the card transport means, preventing succeeding cards from being thrust into a "stacker jam." A similar error condition is indicated by the output pulse from override detector cell PD3 which indicates, as aforementioned, that a card has proceeded too far along eject plate 62 ("late kick") and thus cannot be properly ejected. Provision of these simple jam, or error, detection controls is facilitated by the novel card diverter means and the associated control means according to the invention.

It will be readily apparent to those skilled in the art that the principles of the invention may be implemented in other different ways. For instance, the invention may be modified to offset cards to the left, as in FIGURE 7, rather than to the right as in FIGURE 1. Thus, in FIGURE 7 the first presence detector PD1 is shown as detecting for "Offset" while following detector PD2 detects for "Normal ejection," these detectors being spaced a suitable distance which, together with any electronic delays, will produce a prescribed amount of Offset (cards 70''). Similarly, although a particular form of presence detector (photoelectric) has been indicated, it will be apparent to those skilled in the art that other equivalent detector means may be used and that the detector means may, additionally, provide a variable delay for changing "Offset" and "Normal-eject" positions along platform 62, alone or together. In some cases, platform 62 may be eliminated, for instance where the card-drive keeps cards aligned, such as with a translating card-pickup with a suction grip.

As indicated, the arrangement schematically shown in FIGURE 7 is an alternative, slightly modified embodiment to that described above and shown in FIGURE 1. It will help to clarify the teaching of the invention to functionally described the elements in this alternate embodiment. It will be understood here that the operation of this embodiment is similar to that described above except for those details that are particularly mentioned. Thus, it will be apparent that, similar to the operations indicated in FIGURE 1, punched card records may be advanced along a first path P to be diverted substantially transversely, and "on-the-fly," by resilient actuator blade 20 toward stacking means 72. Stacker 72 is adapted to urge the cards (as above) onto a stacking platform 80 along a stacking direction S—S, substantially transverse to original path P. As before, the passage of cards C12 across the presence detecting eject controls, PD1 and PD2, will serve to activate them, for instance, by interrupting and re-presenting incident light to photocell means therein. Output signals from PD1 and PD2 may control the following actuation of kick-blade 20 for prescribed card diversion. Thus, card C12 is shown (in phantom) just beginning to uncover detector PD2 with its trailing edge. Here, detector PD2 is employed for Normal-eject control, being aligned along axis B2. Thus, for Normal ejection, when detector PD2 is uncovered, it will present a signal to actuate blade 20 to hit the card at a time corresponding to the arrival of the trailing card-edge at Normal ejection axis A, as represented by card C13.

As before, cards are advanced along ejection platform 62 by resilient belt 61 which holds them against platform 62 in positive yielding engagement. Thus, the spacing of Normal detector PD2 from Normal-eject axis A together with any electronic delays will serve to energize blade 20 to thrust the card into engagement with stacker 72 at a time causing it to be stacked in "Normal" alignment. Thus, the signals from Offset detector PD1 will be ignored unless (as before) an "error" ("reject") signal is presented to the electronic controls; in which case the uncovering thereof will provide an earlier energizing signal to kick-blade 20. Thus, the output from PD2 will energize blade 20 to hit cards at a time corresponding to the arrival of a trailing card-edge at Offset-eject axis A′. This will cause ejector blade 20 to eject the card slightly earlier than for the "Normal" mode, so that stacking means 72 will align it in the Offset mode, represented by cards 70″. Thus, it will be apparent that the combined detection-ejection controls, according to the invention may be modified in various ways to provide a versatile simple, quick-acting system, able to divert unit records from a prescribed travel path into prescribed, variable, stack positions.

While in accordance with the provisions of the statutes, there have been illustrated and described the best forms of the invention known, it will be apparent to those skilled in the art that changes may be made in the apparatus described without departing from the spirit of the invention as set forth in the appended claims and that in some cases, certain features of the invention may be used to advantage without a corresponding use of other features.

Having now described the invention, what is claimed as novel and for which it is desired to secure Letters Patent is:

1. In a data processing system, including means for transporting computer unit records along a prescribed path and eject control means for generating signals for initiating record ejection, the combination therewith of improved ejector means for thrusting said records transversely of said path, in response to said signals, said ejector means comprising:

solenoid means including pole pieces arranged to be attractingly energized by said signals; armature means including attracted pole portions arranged to be driven by said pole pieces; and tapered, resilient flexure plate means connected at a lower portion thereof to said armature means so as to be carried therewith into engagement against said records to effect said transverse thrust in an amplifying, whiplash excursion.

2. The combination recited in claim 1 wherein said armature means is mounted by flexible coupling means on said solenoid means so as to be flexurally pivoted with respect thereto during said thrust due to the attracting engagement of said pole pieces and said pole portions, said coupling comprising flexure plate means arranged to be relatively rigid along the normal to said thrust.

3. The combination recited in claim 1 wherein said tapered flexure plate means comprises a plurality of flexible plates interconnected, at the base portions thereof, with said armature, said plates projecting from said base by progressively-increasing effective distances, varying in a cantilevered layered array.

4. The combination recited in claim 1 wherein said blade means is disposed to be spaced in close, continuous propinquity with a fixed backing surface in its unactuated condition for efficiently damping out vibrations thereof.

5. In a record diverter arrangement including blade means adapted to be thrust against said records to divert them transversely of a prescribed path into engagement with record handling means, actuator means connected operatively to said blade means to effect said thrust, and control means adapted to asynchronously energize said actuator means at times controlled by the passage of said records and in a manner whereby the thrust-initiation time indicated by said control means will cause engagement of said records with said handling means for prescribed alignment thereby, said blade means comprising:

a light resilient blade element having a fixed base portion attached to said actuator means and a free resilient end portion projecting from said base portion and adapted to resiliently thrust said records, said blade comprising a plate tapered in the direction of said end portion so as to constitute a relatively low-torque load, resilient and quick-acting element for mechanically amplifying thrust excursions applied thereto.

6. In a unit record handling apparatus; a record diverting station arranged to direct records along a prescribed direction, said station including actuator means and ejector means arranged to be driven by said actuator means against said records at times effective to cause said directing, said ejector means comprising a tapered, resilient blade structure adapted to engage said records adjacent the free end thereof.

7. The combination recited in claim 6 wherein said blade element comprises a plurality of different length blades attached at the base portions thereof to be cantilevered out therefrom in a layered progressively elongated array forming a free, resilient blade tip.

8. An ejection mechanism adapted for use with computer record handling machines for accepting records being advanced along a prescribed path and diverting them "on-the-fly," transverse to said path, for engagement with stacking means, said ejection mechanism comprising:

conveyor means for transporting said records along said path across a fixed plane and in prescribed alignment adjacent said stacking means;

ejector means disposed adjacent said plane for thrusting said records transverse to said path into engagement with said stacking means at prescribed controllably variable times for various, selectable resultant alignments thereof along said axis;

and presence detector means disposed along said path to be traversed by edge portions of said records as they approach said ejector means; said ejector means including actuator means and resilient tapered blade means, said blade means being arranged to be driven by said actuator means and adapted to amplify thrusting excursions thereof.

9. Stop-less record diverting means for use in a data processing system including injection transport means for translating unit records along a prescribed path, a record stacking station and injection means associated therewith, said injection means being located adjacent said path but spaced a prescribed distance therefrom, said diverting means being disposed intermediate said transport means and said injection means for advancing records therebetween without arresting record motion, said diverting means comprising, in combination:

an elongated, smooth alignment surface arranged to accept records from said transport means, said surface extending to a locus adjacent said injection means in prescribed alignment therewith; resilient record-advance means arranged to drive said records across said surface in prescribed alignment at a prescribed speed; record ejector means disposed operatively adjacent said surface and adapted to divert records from said surface across said prescribed distance to be engaged with said injection means; said ejector means comprising solenoid means including attracting pole pieces, armature means including attractable pole portions, resilient flexure-blade means connected, at a lower portion thereof, to said armature means so as to be driven thereby to so divert said records; said blade means comprising a plurality of tapered, layered flexible plates interconnected at the base portions thereof with said armature so as to cantilever varying distances therefrom, and rigid backing-surface means arranged to be in close conforming relation with a surface portion of said blade means in its unactuated condition for damping thereof; and eject control means disposed upstream of said ejector means and adapted to energize said solenoid means in response to the passage of predetermined portions of said records.

10. Unit record translation apparatus adapted to divert unit records presented at a prescribed diverting station by transport means which urges said records along a prescribed path at computer record handling speeds and to transfer these records on the fly to a record stacking means which is operative to advance them, aligned, along one of several parallel stacking axes transverse to said path and which is arranged to stack said records along a stacking platform, said diverting station being disposed adjacent the intersections of said axes and said path, said station comprising a smooth, flat alignment platform and resilient drive means adapted to accept records from said transport means, translating them at a prescribed speed and in alignment along said platform while resiliently urging them against the platform; said translation apparatus comprising:

record thrust means disposed adjacent said station and adapted to thrust records at prescribed selectable times on the fly along selected ones of said axes into engagement with said stacking means to be stacked thereby, said thrust means including resilient blade means having a free flexible tip portion adapted to be normally impacted at high acceleration against an edge of each said record as it is driven along said platform, blade drive means adapted to impart said thrust to said blade at selectable times; and blade-damping means adapted to damp out sympathetic return-vibrations following said thrusting of said blade means; said thrust means being disposed downstream of a prescribed eject control means, said control means comprising presence detector means adapted to activate said blade drive means according to the passage of a prescribed portion of each said record and thus to initiate the diverting thrust of said blade means at times corresponding to positions which, in turn, lead to alignment along a prescribed one of said stacking axes.

11. An ejector adapted for use with a device for stacking like computer unit records, comprising:

record positioning means adapted to advance said records along a first prescribed path across a prescribed platform;

stacking means arranged along a stacking axis relatively transverse to said path and spaced therefrom a distance less than the corresponding dimension of said records in that direction;

and an ejector disposed adjacent said platform for controllably thrusting said records into engagement with said stacking means "on-the-fly," without arresting their motion along said path, said ejector comprising a resilient, outwardly-tapered blade means.

12. Improved ejector adapted for use with a device for controllably stacking processable data records in prescribed variable alignment along a stacking hopper, comprising:

record inject means for advancing each record along a first predetermined inject-locus in prescribed alignment; stacking means disposed adjacent said inject-locus for advancing said records successively and in prescribed alignment along a stacking direction, relatively transverse to said locus, into said hopper; an ejector disposed adjacent the intersection of said path and said direction for impacting said records on the fly to divert them from said path along said direction into engagement with said stacking means; and presence detector means disposed along said path, upstream of said ejector, for variably controlling the initiation time of said ejector according to the passage of a predetermined portion of each said record; said ejector comprising an outwardly tapered resilient, whiplash blade means for applying said diverting thrust overamplified excursion distances.

13. In a punched-card stacking arrangement for diverting cards moving along a path from that path, "on-the-fly," and into engagement with card stacking means, said arrangement including:

blade means adapted to thrust said cards relatively transverse said path on the fly; actuator solenoid means arranged to drive said blade means and so effect said thrust, said solenoid means including a pair of pole portions; record inject means adapted to present cards along a stacking platform arranged along said path and including resilient drive-belt means adapted to advance said cards across said platform at a prescribed speed while urging them against said platform; and detect control means adapted to asynchronously initiate said solenoid means at times corresponding to a prescribed positional relation of a subject card adjacent said blade means, said relation being such as to induce engagement with said stacking means for a corresponding selectible stacking alignment; said blade means comprising: an armature portion pivotably mounted from said solenoid means by flexible coupling means and arranged to be attracted into engagement with said pole portions and a light resilient, tapered, multipart leaf portion cantilevered out from said armature portion for resiliently engaging said cards to thrust them over amplified excursions in response to the energization of said solenoid, said leaf portion comprising a plurality of resilient plates attached in common and taperingly to said armature portion so as to project out therefrom by progressively increasing effective lengths, said flexible coupling means including flexure plate means connected to resiliently pivot said armature portion about said solenoid means.

14. Soletnoid-actuated diverter means adapted for use with a data card handling apparatus including transport means for translating card so as to assume a prescribed speed and alignment along a prescribed path, control means for generating signals adapted to control the diversion of said cards transverse from said path, and removal means for translating said cards away from the region of said path, said removal means being located adjacent said path but spaced a prescribed distance therefrom, said diverter means being adapted to selectably thrust cards transversely of said path "stop-lessly" and without reducing their original speed, into engagement with said removal means in response to control signals from said control means, said diverter means comprising:

solenoid-activated magnet means arranged to be energized by said control signals;

armature means arranged to be actuated by said magnet means;

and resilient tapered foil means carried by said armature means and arranged to so engage said cards along said path and thrust them transversely and "stop-lessly," said foil means being arranged to be relatively rigid along a dimension in the direction of said path and relatively resilient along a transverse dimension.

References Cited by the Examiner

UNITED STATES PATENTS

| | | | |
|---|---|---|---|
| 2,892,627 | 6/1959 | Newhouse | 270—55 |
| 2,995,240 | 8/1961 | Cunningham et al. | 209—110 |
| 3,042,199 | 7/1962 | Welchman et al. | 271—3 X |
| 3,052,467 | 9/1962 | Fertig | 271—71 |
| 3,139,278 | 6/1964 | Maidment | 271—71 |
| 3,173,534 | 3/1965 | Atanasoff | 198—188 |
| 3,207,505 | 9/1965 | Nielsen et al. | 271—3 |

M. HENSON WOOD, JR., *Primary Examiner.*

J. N. ERLICH, *Assistant Examiner.*